(No Model.)

E. H. UPHAM.
COMBINED SCREW DRIVER AND SCREW HOLDER.

No. 583,158. Patented May 25, 1897.

Witnesses
A. F. Toovey.
F. Lugg.

Inventor
Edgar H. Upham.

UNITED STATES PATENT OFFICE.

EDGAR H. UPHAM, OF ORLEANS, MASSACHUSETTS.

COMBINED SCREW-DRIVER AND SCREW-HOLDER.

SPECIFICATION forming part of Letters Patent No. 583,158, dated May 25, 1897.

Application filed August 1, 1896. Serial No. 601,358. (No model.)

*To all whom it may concern:*

Be it known that I, EDGAR H. UPHAM, a citizen of the United States, residing at Orleans, in the county of Barnstable and State of Massachusetts, have invented a new and useful Combined Screw-Driver and Screw-Holder, of which the following is a specification.

My invention relates to an improved clip by means of which a screw can be held on the end of the screw-driver blade and the driver manipulated with one hand when inserting screws in places difficult of access, such as clock-cases and cabinets, and in electrical and other machinery.

I am aware that screws have been held on the screw-driver blade by spring-clips, but former methods have been open to the objections of expensive construction and that the attachment has not been entirely out of the way when not in use.

My device avoids the defects mentioned and provides a clip of extreme simplicity having a wide range of capacity and one that can be made and sold without increasing the cost of the screw-driver.

My device is shown in the accompanying drawings, in which—

Figures 1, 2:
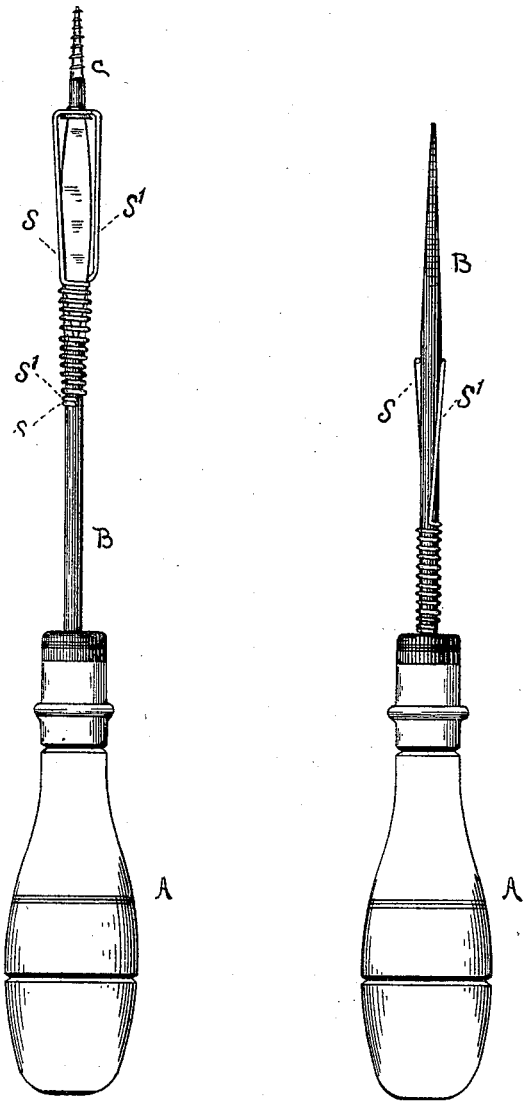
Figure 3:

Figure 1 is a general view with clip in place holding a screw; Fig. 2, a view with clip drawn back to handle; Fig. 3, a view in perspective of a modification of the clip.

Referring to Fig. 1, A represents the handle of the screw-driver; B, the blade; C, a screw; S and S', a clip formed of two wires coiled together and formed with two extensions, the ends of which are bent at right angles. These bent ends are parallel to each other and when the clip is in place are in contact and are parallel with the end of the blade.

The blade of the screw-driver is spread in forming the point and this increased width serves to hold the clip firmly in place when in use, the coiled part of clip jamming on the enlarged portion of the blade.

A screw is inserted as follows: The screwdriver is held in one hand and the screw between the thumb and forefinger of the other. One spring is raised with the little finger of hand holding the screw and the head of screw is at the same time pressed on the end of the other spring. The slot of screw slips on the end of the blade and the springs snap into place, one on each side of the screw-head. This operation is nearly instantaneous and is very readily performed in practice, and the clip holds all sizes and kinds of screws securely.

When not in use, the clip is drawn down to the handle, with one spring on each side of the blade. The springs being thus forced apart grip the blade sufficiently to hold the clip at any desired point.

I do not confine myself to the coiled-spring clip made from two wires, as the clip can be made from one length, and in Fig. 3 show a modification, which consists of a clip of the same general shape as the coiled clip, formed from stamped steel, which may be applied to or removed from the screw-driver at any time. This stamped clip jams on the enlarged part of the blade in the same manner and the operation is exactly the same as in the case of the coiled-spring clip.

Having thus described my invention, I claim and desire to secure by Letters Patent of the United States—

1. A screw-holding clip consisting of a coiled-spring sleeve forming a bearing for the screw-driver blade, and having spring-fingers formed from extensions of said coil, substantially as described.

2. A screw-holding clip consisting of a spring-sleeve having two spring extensions formed substantially as described.

3. In a screw-driver, the combination of a blade and a spring-clip adapted to slide thereon, the sleeve of said clip jamming on an enlargement of the blade, substantially as described.

In testimony whereof I affix my signature in presence of two witnesses.

EDGAR H. UPHAM.

Witnesses:
 A. F. TOOVEY,
 H. M. PERCIVAL.